United States Patent [19]
Detais

[11] Patent Number: 5,909,096
[45] Date of Patent: Jun. 1, 1999

[54] CONTROL SYSTEM FOR A VEHICLE SCREEN WIPING APPARATUS

[75] Inventor: Eric Detais, Chatillon, France

[73] Assignee: Valeo Systemes D'Essuyage, La Verriere, France

[21] Appl. No.: 08/807,486

[22] Filed: Feb. 27, 1997

[30] Foreign Application Priority Data

Feb. 29, 1996 [FR] France .................................. 96 02570

[51] Int. Cl.$^6$ ................................. A47L 1/00; H02P 1/00
[52] U.S. Cl. .......................... 318/282; 318/285; 318/468; 318/DIG. 2; 15/250.17
[58] Field of Search ................................. 318/280–286, 318/293, 466–470, DIG. 2; 15/250.001, 250.11, 250.14, 250.16, 250.17, 250.19

[56] References Cited

U.S. PATENT DOCUMENTS

| | | | |
|---|---|---|---|
| 4,310,943 | 1/1982 | Palma .................................. | 15/250.01 |
| 4,544,870 | 10/1985 | Kearns et al. ........................... | 318/444 |
| 4,614,903 | 9/1986 | Betsch et al. ........................... | 318/443 |
| 4,692,677 | 9/1987 | Bauer et al. ............................. | 318/443 |
| 5,225,752 | 7/1993 | Yasuda et al. ........................... | 318/443 |
| 5,355,061 | 10/1994 | Forhan .................................... | 318/443 |
| 5,506,483 | 4/1996 | McCann et al. ......................... | 318/444 |
| 5,568,026 | 10/1996 | Welch .................................... | 318/443 |
| 5,712,547 | 1/1998 | Porter et al. ............................ | 318/282 |

FOREIGN PATENT DOCUMENTS

| | | |
|---|---|---|
| 40 39 038 | 6/1992 | Germany . |
| 2 047 919 | 12/1980 | United Kingdom . |
| 2 146 799 | 4/1985 | United Kingdom . |

OTHER PUBLICATIONS

Patent Abstracts of Japan, vol. 010, No. 246 (M–510), Aug. 23, 1986 & JP–A–61 075044 (Nissan Motor Co. Ltd.), Apr. 17, 1986.

*Primary Examiner*—Brian Sircus
*Attorney, Agent, or Firm*—Morgan & Finnegan, LLP

[57] ABSTRACT

A screen wiping apparatus, in particular for an opening window of a motor vehicle, comprises an electric motor which drives at least one screen wiper in oscillating motion between two reversal positions, namely a fixed inner stop position and a fixed outer stop position. In addition, the blade is able to be retracted into a parked position which lies away from the window, when the window is to be opened. The apparatus includes a control system whereby the power supply voltage to the motor is variable by adjustment between a zero voltage and a maximum or full power voltage. The control system includes means for reducing the power supply voltage to the motor when the screen wiper passes from the fixed inner stop position to the off-window parked position.

15 Claims, 3 Drawing Sheets

CONTROL SYSTEM FOR A VEHICLE SCREEN WIPING APPARATUS

FIELD OF THE INVENTION

The present invention relates to a control system for a screen wiping apparatus for wiping over a window of a vehicle. More particularly, the invention relates to screen wiping apparatus which is adapted for use on windows that are capable of being opened. This is especially the case with wiping apparatus for the rear windows of vehicles of the shooting brake or "monospace" types. In these cases, the screen wiper blade must be in a position retracted away from the window when the window is open.

BACKGROUND OF THE INVENTION

To this end, proposals have been made in the prior art to provide screen wiping apparatus for openable windows of vehicles, in which the wiper blade (and therefore the wiper) is positioned off the window when the wiping system is out of use. In these cases the wiper is retracted away from the window once opening of the window is detected during operation of the wiper motor.

However, when the wiper passes off the window and on to the bodywork of the vehicle, the rubber wiping strip of the wiper blade rubs on the paintwork of the vehicle and this gives rise to the danger of scratching of the paintwork if any dirt is stuck to the wiping strip. In addition, the rubber wiping strip itself is in danger of being damaged by these repeated movements from the window on to the bodywork and vice versa.

One solution to this problem consists, in the manner which is described in particular in U.S. Pat. No. 4,310,943, in guiding the screen wiper arm in a ramp or a guide finger when it is desired to retract the screen wiper off the window. Although this ramp or guide finger does enable direct contact between the rubber wiping strip and the bodywork of the vehicle to be avoided, this solution has a major disadvantage, in that when the wiper blade meets the ramp, the resulting impact makes a noise which is highly disagreeable for the occupants of the vehicle. In addition, there is a danger of people, and particularly children, getting their fingers trapped between the wiper blade and the ramp.

DISCUSSION OF THE INVENTION

An object of the present invention is to overcome the above mentioned drawbacks.

According to the invention, a control system for a screen wiping apparatus, especially for use in conjunction with an openable window of a motor vehicle, and comprising: an electric motor for driving at least one screen wiper blade in oscillating motion between two reversal positions, namely a fixed inner stop position and a fixed outer stop position, the said blade being able to be retracted into a parked position situated off the window; means for providing a signal indicating the presence of the said blade at predetermined reference positions; and means responsive to a control signal for regulating the power supply voltage to the electric motor between a zero voltage and a full power voltage, is characterised in that it includes voltage reducing means for reducing the power supply voltage to the motor when the screen wiper blade passes from the fixed inner stop position to the off-window parked position.

Thus, the velocity of the screen wiper blade is reduced when the said blade moves off the window and towards its off-window parked position, and this greatly reduces the impact noise described above. In addition, the dangers of fingers or hands becoming trapped between the wiper blade and the ramp are considerably reduced, because, since the blade is moving at a reduced speed, more time is left for a person to withdraw their fingers.

According to a preferred feature of the invention, the said means for reducing the power supply voltage are adapted to apply a first fraction of the full power voltage to the electric motor when the screen wiper blade passes from the fixed inner stop position to the off-window parked position. The said first fraction is preferably substantially equal to 50% of the full power voltage.

According to another preferred feature of the invention, the means for reducing the power supply voltage to the motor are also applied when the wiper blade travels in a wiping zone over an angular zone which precedes the said fixed inner stop position.

According to a further preferred feature of the invention, the means for reducing the power supply voltage to the motor are adapted so as to reduce gradually the said power supply voltage between full power voltage and a second fraction, greater than the first fraction, of the said full power voltage when the wiper blade is passing through the angular zone preceding the said fixed inner stop position. This second fraction of the full power voltage is preferably substantially equal to 70% of the full power voltage.

The velocity, or wiping speed, of the screen wiper blade thus diminishes progressively as the blade completes its travel over the window; and when it parts company with the window so as to move to its parked position, it does so at a constant reduced speed.

According to yet another preferred feature of the invention, the control system further includes means for counting the time period elapsed from the instant at which the blade passes through the fixed inner stop position when moving towards the parked position, in such a way that, if this time period exceeds a first predetermined time period before the said blade has reached the off-window parked position, the means for regulating voltage are then adapted so as to apply full power voltage to the electric motor until the blade has effectively reached the said off-window parked position. This first predetermined time period is preferably substantially equal to 500 milliseconds.

Thanks to this feature, if any external event happens to prevent the wiper blade from reaching its parked position in the desired time, the voltage across the terminals of the motor is increased, thus increasing the motor torque so as to enable the wiper blade effectively to attain its parked position.

According to a still further preferred feature of the invention, the means for reducing the power supply voltage are adapted so as: (a) at the end of the said predetermined first time period, to apply to the motor a third fraction of the full power voltage for a predetermined second time period shorter than the said predetermined first time period, the said third fraction being greater than the first fraction of the said full power voltage which is applied during the predetermined first time period; and (b) to subsequently apply full power voltage.

This predetermined second time period is preferably substantially equal to 200 milliseconds.

Thus, in the case where the screen wiper blade has not reached its parked position as soon as desired, instead of directly reapplying full power voltage across the motor terminals, an intermediate voltage is first applied, the value of which is between 50% of the full power voltage and the full power voltage itself, this being done with a view to preventing too-sudden changes in the motion of the screen wiper blade.

The invention preferably further provides that the control system includes means for applying the said first fraction of the full power voltage to the motor at the beginning of the wiping operation, for a third predetermined time period when the wiper blade leaves the off-window parked position going towards the window, with full power voltage being applied to the motor at the end of the said predetermined third time period. This predetermined third time period is preferably substantially equal to the predetermined first time period.

The wiping speed of the screen wiper blade is thus also reduced, especially when it is leaving its parked position in order to form a wiping operation on the window. This leads to a reduction in the noise caused by the blade as it leaves the guide ramp.

According to a further preferred feature of the invention, the control system also includes means for gradually increasing the voltage applied to the motor between the said first fraction of full power voltage and full power voltage itself, over a predetermined fourth time period. The said predetermined fourth time period is preferably substantially equal to 70 milliseconds.

According to another preferred feature of the invention, the power supply voltage to the motor is reduced or augmented by causing the period of voltage pulses applied to the said motor to vary.

Further features and advantages of the invention will appear more clearly on a reading of the following detailed description of a preferred embodiment of the invention, given by way of non-limiting example only and with reference to the accompanying drawings.

DESCRIPTION OF A PREFERRED EMBODIMENT OF THE INVENTION

Figure 1:
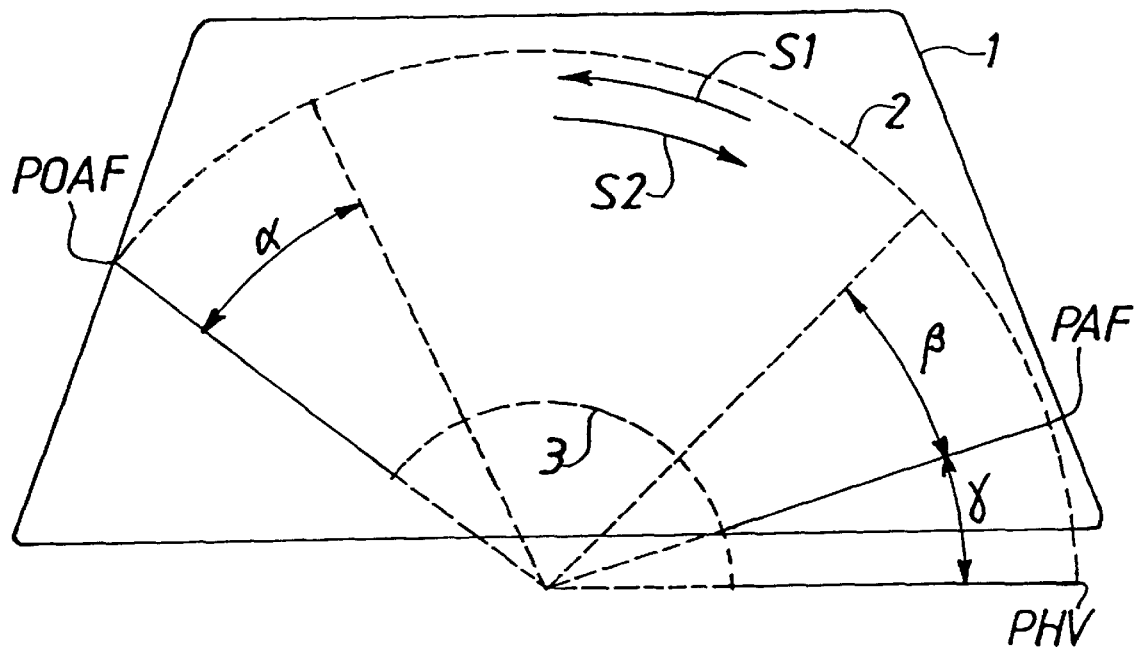
FIG. 1 is a diagrammatic representation of a vehicle window which is swept by a screen wiper blade.

FIG. 1 shows diagrammatically a vehicle window 1, over which a screen wiper blade is passed. The wiping zone of the window is the semicircular area between the two broken lines 2 and 3 in FIG. 1. When the wiping system is in action, the wiper blade travels over the window 1 in alternating motion, firstly in the direction indicated by the arrow S1, between two reversal positions, namely a fixed inner stop position PAF and a fixed outer stop position POAF, and in the opposite direction indicated by the arrow S2.

Since this wiping system is intended for use in particular on a vehicle window that is capable of being opened, the wiper blade must be able to part company with the window when it is desired to open the latter. This being so, it is arranged that the wiper blade then shifts into a parking position PHV, away from the window. It is possible to choose to turn the wiper blade to its off-window parked position PHV each time that the user stops the wiping operation; alternatively, the wiper blade can normally be left on the window in its fixed inner stop position PAF when a command is given for the wiping operation to stop. In each case, every time opening of the window is detected, the blade is returned to the off-window parked position PHV.

The wiping system is driven by a reversing electric motor having two terminals, which is supplied with power alternately in one direction and then the opposite direction so as to provide the oscillating motion of the screen wiper.

In order to attenuate the noise made by the wiper blade when it passes through the reversal positions PAF and POAF, the supply voltage of the motor is reduced in angular ranges α and β which precede and follow the two reversal positions, so as to reduce the velocity of the wiper blade within these angular ranges. The two angles α and β are generally made equal to each other.

When the wiper blade is put in its off-window parked position PHV, it may be positioned, as is described above, on a ramp (not shown) which holds the rubber wiping strip of the blade out of contact with the bodywork of the vehicle. In order that there shall be no significant sound produced as the wiper blade moves on to the this ramp, a reduced voltage is applied to the electric motor when the wiper blade passes through the angular range γ which extends between the fixed inner stop position PAF and the off-window parked position PHV. As a result, the blade traverses this angle γ at a reduced speed.

Figure 2:
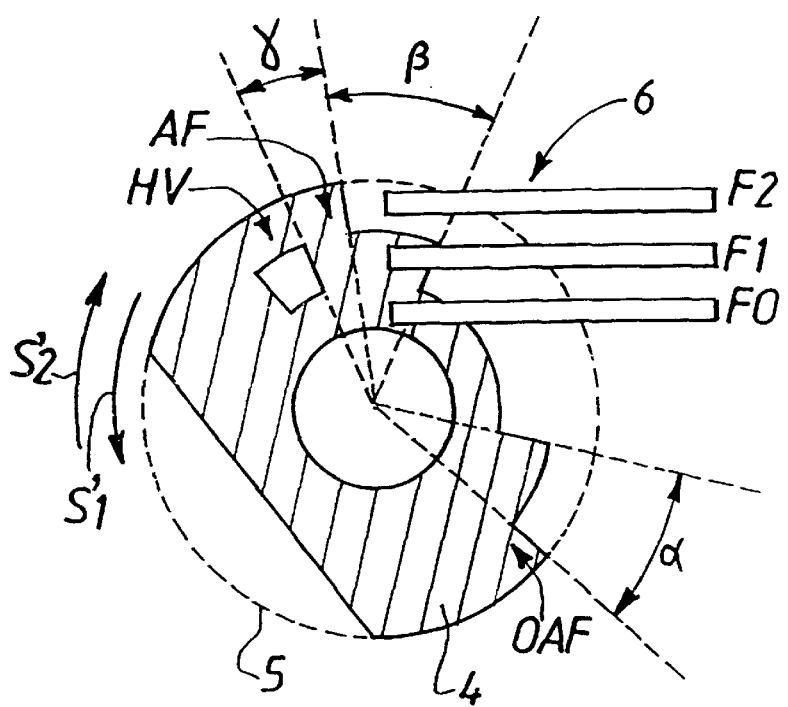
FIG. 2 shows a device mounted on the motor, for generating signals which enable certain positions of the screen wiper blade to be detected.

FIG. 2 shows one device 6 for detecting reference positions of the screen wiper blade. It comprises a metallic plate 4 which is situated on a support 5. This support 5 generally consists of a toothed wheel, which is coupled to the output spindle of the speed reducing transmission (gearbox) that is associated with the electric motor in the known way.

Metallic wiping contacts F0, F1 and F2 are arranged to make contact with the metallic plate 4, so as to transmit signals to the control unit of the wiping system. Circular tracks are defined on the metallic plate 4 and on its associated support 5. Each of these tracks corresponds to the path travelled by the associated wiping contact F0, F1, F2 when the support 5 is driven in rotation in the direction S'1 or S'2 by the electric motor. The directions S'1 and S'2 respectively correspond to the directions S1 and S2 in which the screen wiper blade is driven over the window 1 (FIG. 1). The wiping contact F0 is permanently connected to ground, so that the whole of the metallic plate 4 is itself grounded. The wiping contacts F1 and F2 are put alternately either at ground potential or at a high voltage, according to whether or not they are in contact with the metallic plate 4.

When the wiper blade is in its off-window parked position PHV (FIG. 1), the wiping contacts F0, F1 and F2 are in contact with the zone HV of the detector 6, that is to say the wiping contact F1 is not in contact with the metallic plate 4, while the wiping contact F2 is in contact with this plate 4. The contact F1 therefore passes a high voltage to the control device of the wiping system, while the contact F2 delivers a zero voltage.

When the screen wiper blade is in the fixed inner stop position PAF on the window 1, or when it is in the fixed outer stop position POAF, the wiping contacts are in contact with the zone AF or the zone OAF, respectively, of the detecting device 6. The contacts F1 and F2 are therefore connected to ground, and deliver a zero voltage to the control device. Similarly, in the angular ranges α and β, the wiping contacts are in contact with specific zones of the detecting device 6, in which the contact F1 is connected to ground while the contact F2 is at a high voltage because it is not in contact with the plate 4. The information which is delivered in the form of voltage signals by the wiping contacts F1 and F2 therefore enables the presence of the wiper blade at reference positions on the window to be detected.

Figure 3:
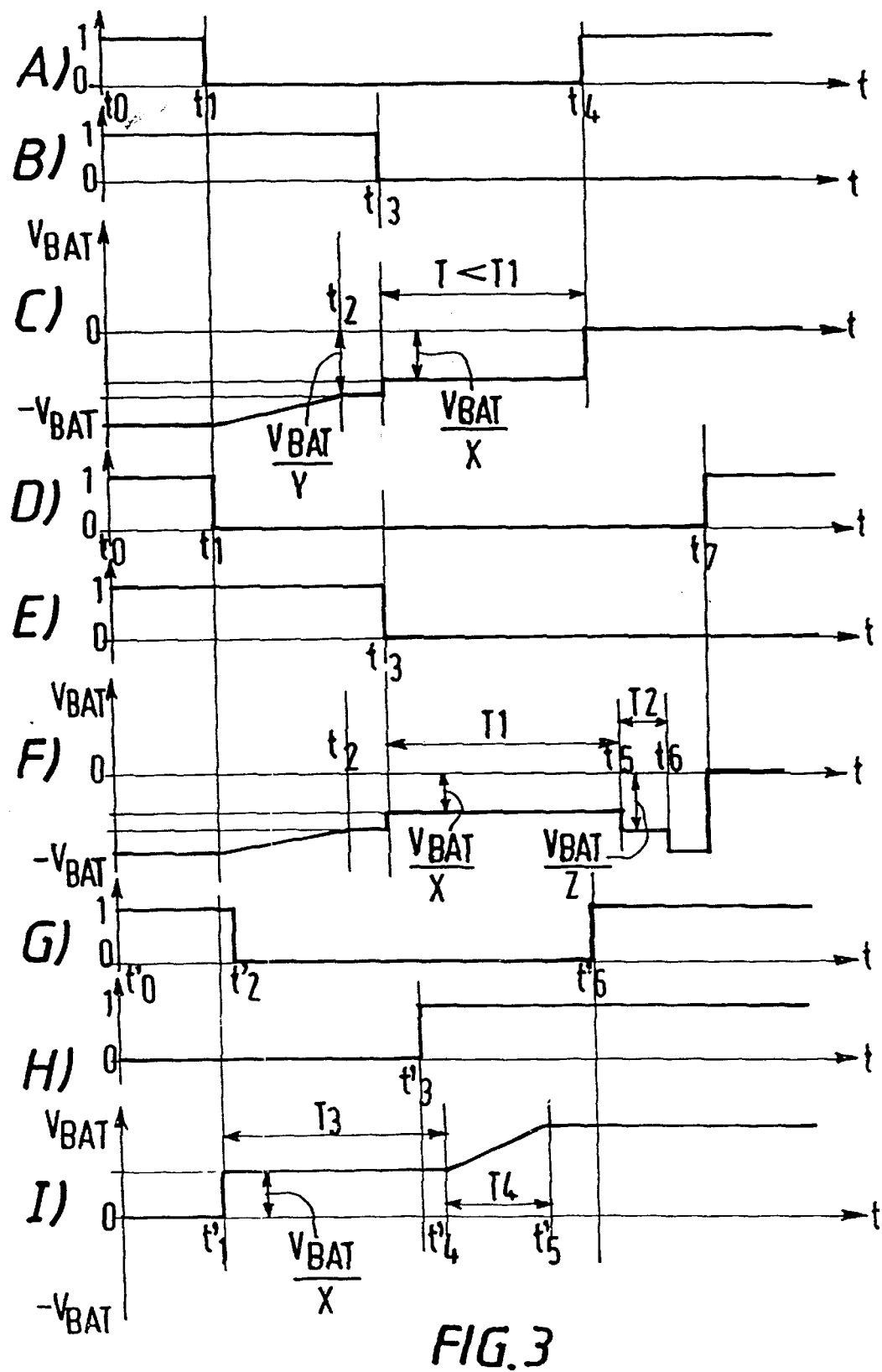
FIG. 3 is a set of time diagrams illustrating the invention.

FIG. 3 shows, as a function of time, the waveforms of the signals delivered by the wiping contacts F1 (FIGS. 3A, 3D and 3G) and F2 (FIGS. 3B, 3E and 3H). The voltage which is applied across the terminals of the motor are shown in FIGS. 3C, 3F and 3I, in three different situations.

In the first of these situations, illustrated by FIGS. 3A to 3C, the screen wiper blade is in the course of wiping over the window, and a control signal, initiated at the instant $T_0$, has started passing into the off-window parked position PHV. This control signal may be derived from the switching device which is activated by the user of the vehicle for controlling starting or stopping of the wiping system. In the present case, this happens when the user commands the system to stop. The control signal may also be derived from detection of opening of the window, which causes the wiper blade to be put into its off-window parked position.

At the moment of inception $t_0$, the signals from the wiping contacts F1 and F2 are at a high voltage which is indicated by level 1 in FIGS. 3A and 3B. This signifies that the wiper blade is passing over the central zone of the window, lying between the two angular ranges α and β. In this case, since the motor is supplied at a voltage $-V_{BAT}$ (see FIG. 3C), that is to say by the voltage from the battery of the vehicle which is applied in reverse across the terminals of the motor, the blade passes over the window in the direction S2. At the instant $t_1$, it reaches the angular range β, which causes the signal from the wiping contact F1 to change to zero, because the wiping contact F1 has come into contact with the metallic plate 4, FIG. 2.

Between the instants $t_1$ and $t_2$, the voltage across the motor has progressively diminished, at least in absolute value, because it passes from $-V_{BAT}$ to $-(V_{BAT}/Y)$, which leads to progressive slowing down of the screen wiper blade. In practice, $V_{BAT}/Y$ is preferably chosen to be equal to 70% of the battery voltage $V_{BAT}$.

This voltage $-(V_{BAT}/Y)$ is applied to the motor until the instant $t_3$ occurs at which the screen wiper blade reaches the fixed inner stop position PAF, FIG. 1, whereupon the signal from the wiping contact F2 passes to zero as shown in FIG. 3B. As from this instant $t_3$, and until the wiper blade reaches the off-window parked position PHV, FIG. 1, at the instant $t_4$, a voltage $-(V_{BAT}/X)$ is applied to the motor terminals. Preferably, a fraction $V_{BAT}/X$, equal to 50% of the battery voltage $V_{BAT}$, is applied.

At the instant $t_4$, the arrival of the wiper blade in its off-window parked position is represented by the signal from the wiping contact F1 (FIG. 3A) going to level 1, while the arrival of the wiper blade in the parked position causes the voltage applied to the motor to pass to zero, see FIG. 3C.

It should be noted here that a time-counting operation is started at the instant $t_3$. If the time which has elapsed after the instant $t_3$ becomes greater than the predetermined time period T1 before the screen wiper blade has reached the off-window parked position PHV, then the motor is re-energised at a voltage which is higher in absolute value than the voltage $-(V_{BAT}/X)$. This predetermined time period T1 is preferably chosen to be equal to 500 milliseconds.

In the situation shown in FIGS. 3A to 3C, this situation is not produced, because the time T which has elapsed between the instants $t_3$ and $t_4$ is shorter than the period T1. By contrast, in the situation represented in FIGS. 3D to 3F, which is otherwise similar to the foregoing situation between the instants $t_0$ and $t_3$, it will be noted that at the instant $t_5$, when the period T1 has elapsed, the wiper blade has still not reached its off-window parked position, because the signal from the wiping contact F1 is still at zero.

Starting at the instant $t_5$, and for a second predetermined time period T2, a voltage $-(V_{BAT}/Z)$ is accordingly applied to the motor. The absolute value of this voltage is greater than the voltage $-(V_{BAT}/X)$. For example, a time period T2 is chosen to be equal to 200 milliseconds, and 70% of the battery voltage $V_{BAT}$ is applied during this period.

If the screen wiper blade has still not reached its off-window parked position PHV at the end of this second predetermined period T2, then at the instant $t_6$, the battery voltage $-V_{BAT}$ is applied in order to set the motor at full power, so that the wiper blade is able to reach the parked position PHV, which occurs at an instant $t_7$ shown in FIG. 3D.

If the blade reaches the parked position PHV before the end of the predetermined second period T2, which would result in the signal from the wiping contact F1 passing to level 1, then a zero voltage would be applied to the electric motor, by short circuiting its two supply terminals.

In another version of the method, the voltage $-V_{BAT}$ may be applied directly to the terminals of the motor at the end of the first predetermined period T1. In this connection, the period T1 is in practice so calculated that the wiper blade will generally have time to reach its off-window parked position PHV before the period T1 has in fact ended, in spite of its reduced velocity. As a consequence, if the blade has not reached its off-window parked position during the period T1, then its path to the parked position is probably obstructed by some obstacle, and it is appropriate to supply an increased voltage to the electric motor.

In the third situation, which is shown in FIGS. 3G to 3I, it is supposed that at the instant $t'_0$, the wiper blade is in the off-window parked position PHV. At the instant $t'_1$, a command signal from the switching unit actuated by the user of the vehicle starts the wiping operation. If the window is open at that instant, the starting command for the wiping operation is inhibited. On the other hand, if the window is closed, which is the case in the example illustrated by FIGS. 3G to 3I, a voltage $V_{BAT}/X$ is applied across the terminals of the motor. This voltage is approximately equal to 50% of the battery voltage $V_{BAT}$. Thus, the blade leaves its off-window parked position PHV, and the ramp on which it was parked, at a reduced velocity. This limits noise as the blade descends from the ramp or mounts on to the window.

This voltage $V_{BAT}/X$ is applied to the motor for a predetermined period T3, which is equal for example to 500 milliseconds. Then, at the instant $t'_4$, the voltage across the terminals of the motor is gradually increased up to the battery voltage $V_{BAT}$, over a predetermined period T4 which is substantially equal to 70 milliseconds, and which ends at the instant $t'_5$.

The signals from the wiping contacts F1 and F2 indicate that at the instant $t'_2$, the wiper blade is leaving its off-window parked position PHV and is starting to sweep over the angular zone γ. At the instant $t'_3$, the blade passes through the fixed inner stop position PAF, and begins to wipe over the angular zone β. It leaves the zone β at the instant $t'_6$.

It may be noted here that, since the motor is supplied with a positive voltage in this third situation, the wiper blade is driven in the direction S1, FIG. 1, over the window.

Figure 4:
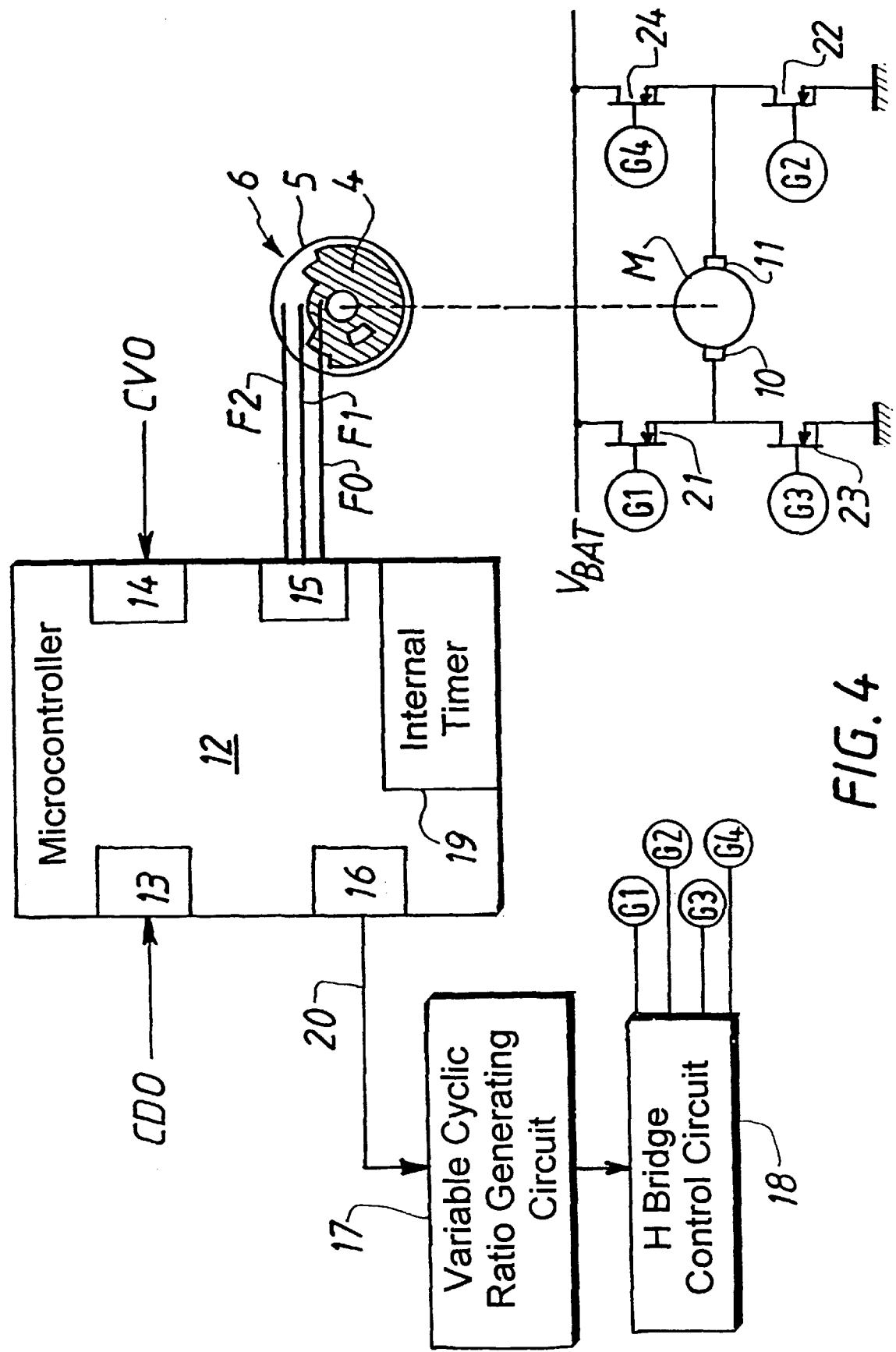
FIG. 4 is a block diagram of the control system of the invention.

Reference is now made to FIG. 4, which shows the control system. In FIG. 4, the electric motor M is shown with its two power supply terminals 10 and 11. These can be supplied with power alternately by the battery voltage $V_{BAT}$, or by the inverse voltage $-V_{BAT}$, through an H bridge comprising transistors 21 to 24. These transistors are made conducting or non-conducting by control signals which are applied on their respective grids G1 to G4.

FIG. 4 also shows the detecting device 6 for detection of reference positions of the screen wiper blade, which has already been described with reference to FIG. 2. The signals from the wiping contacts F0, F1 and F2 of the detector 6 are applied to the input 15 of a control unit or microcontroller 12. The control unit 12 also receives, on an input 13, information signals derived from the switching device CDO operated by the user of the vehicle. The switch CDO is adapted, inter alia, to set the wiper in continuous or intermittent action, and to stop the wiping system.

The microcontroller also receives, on an input 14, a signal CVO, which, when it is in its high state, indicates that the window is closed, while in its low state (in which it is at ground potential), it indicates that the window is open. The microcontroller 12 also contains an internal timer 19, together with a memory which contains the values of the various predetermined time periods T1, T2, T3 and T4 and the values of the fractions $V_{BAT}/X$, $V_{BAT}/Y$ and $V_{BAT}/Z$ of the battery voltage which are applied to the motor in the various situations described above with reference to FIG. 3.

In addition, the microcontroller 12 has an output 16 which is applied to the input of a variable cyclic ratio generating circuit 17. This circuit 17 is connected to a further circuit 18, which controls the H bridge and has four outputs, which are connected respectively to the grids G1 to G4 of the transistors 21 to 24.

The control device of FIG. 4 operates as follows. The microcontroller 12 receives appropriate signals (which can be called "system input signals") from the switching device CDO, from the open-window detector CVO, and from the wiping contacts F1 and F2 indicating the reference positions of the wiper blade on the window, or indeed from the internal timer 19 when one of the predetermined time periods T1, T2, T3 or T4 has been exceeded. On the basis of these various signals, the microcontroller 12 produces a control signal 20 on its output 16, which is transmitted in the form of a four-bit word to the circuit 17, which generates a variable cyclic ratio signal between 0 and 100%, in steps of $\frac{1}{8}$, between 0 and $+V_{BAT}$, or between 0 and $-V_{BAT}$.

The circuit 17 is a time modulated pulse control circuit. Through the interposed circuit 18, the circuit 17 controls the periods of time in which the transistors 21 to 24 of the H bridge are in the conducting state, which enables voltage pulses, the duration of which is controlled by the control signal 20, to be applied to the electric motor M. In practice, during those periods in which the motor is to be supplied at full voltage so as to have a voltage equal to $+V_{BAT}$, the transistors 21 and 22 are conducting, while the transistors 23 and 24 are conducting in order to give a voltage equal to $-V_{BAT}$. When it is necessary to apply a zero voltage to the motor, its terminals 10 and 11 are short circuited by making the transistors 21 and 24, or else the transistors 22 and 23, conducting.

In the periods in which a voltage having a value intermediate between 0 and $+V_{BAT}$ is to be applied, the transistor 21 is made conducting, while the transistors 23 and 24 are non-conducting; and the transistor 22 is made alternately non-conducting (i.e. with zero voltage) and conducting (with voltage $V_{BAT}$). This enables an intermediate mean voltage to be obtained across the terminals of the motor. The value of this mean voltage depends on the conduction times of the transistor 22, and therefore on the cyclic ratio of the control signal which is applied on its grid.

The same principle is applied when it is required to obtain an intermediate voltage between the values $-V_{BAT}$ and zero, by making the transistor 24 conducting and the transistors 21 and 22 non-conducting, and by causing the conduction time of the transistor 23 to be varied.

The embodiment described above is in no way limiting, and may be replaced with a system having any desirable modification without thereby departing from the scope of the invention. In particular, the electric motor may be supplied with power in only one direction when the screen wiper blade carries out its to and fro motions over the glass of the window, the motor being supplied with power in the opposite direction only when the wiper blade is put into its off-window parked position.

In addition, the apparatus according to the invention may be used with advantage even when the wiper blade is not guided on to a ramp as it is put into an off-window parked position. In that case there do exist risks that fingers may become jammed between the wiper blade and the bodywork, and these risks are considerably reduced when a system in accordance with the invention is used.

What is claimed is:

1. Screen wiping apparatus for wiping a motor vehicle window, comprising:

at least one screen wiper;

an electric motor coupled to said at least one screen wiper for driving the wiper;

a power source for supplying the motor with power; and a control system connected to the motor for controlling the motor, said control system comprising:

means defining two reversal positions on the window, namely a fixed inner stop position and a fixed outer stop position, the motor for driving the wiper in oscillating motion between said reversal positions;

means defining an off-window parked position for the wiper spaced away from said fixed inner stop position and situated beyond the window, the motor for moving the wiper between said inner stop and parked positions;

means for producing system input signals, including detecting means for giving electrical signals indicating the presence of the wiper at predetermined reference positions;

voltage regulating means responsive to said system input signals for regulating the voltage supplied from said power source to the motor, wherein the control system further includes means for reducing the power source voltage when the wiper passes from the said fixed inner stop position to the parked position; and timer means for counting time elapsed from the instant at which the wiper passes through the said fixed inner stop position going towards the said parked position, in such a way that, if the said elapsed time exceeds a predetermined first period before the wiper reaches the said parked position, the voltage regulating means then apply full power voltage to the motor until the wiper effectively reaches the said parked position.

2. Apparatus according to claim 1, wherein the said voltage reducing means apply a first fraction of the full power voltage of the motor to the motor when the wiper passes from the said fixed inner stop position to the said off-window parked position.

3. Apparatus according to claim 2, wherein the said first fraction is substantially equal to 50% of the full power voltage.

4. Apparatus according to claim 1, wherein the control system further defines an angular range of wiping motion of the wiper on the window terminating at the said fixed inner stop position, the voltage reducing means acting when the wiper is passing through the angular wiping range.

5. Apparatus according to claim 4, wherein the said voltage reducing means reduce the power supply voltage gradually between full power voltage and a second fraction, greater than the said first fraction, of said full power voltage when the wiper is passing through the inner reversal region towards the fixed inner stop position or through the outer reversal region towards the fixed outer stop position.

6. Apparatus according to claim 5, wherein the said second fraction is substantially equal to 70% of the full power voltage.

7. Apparatus according to claim 1, wherein the said predetermined first period is substantially equal to 500 milliseconds.

8. Apparatus according to claim 1, wherein the said voltage reducing means (a) apply to the motor, at the end of the said predetermined first period, a third fraction of full power voltage for a predetermined second period shorter than the said predetermined first period, the said third fraction being greater than the first fraction of full power voltage applied to the motor during the said predetermined first period, and (b) subsequently to apply full power voltage to the motor.

9. Apparatus according to claim 8, wherein the predetermined second period is substantially equal to 200 milliseconds.

10. Apparatus according to claim 8, wherein the control system further includes means for applying the said first fraction of the full power voltage, at the beginning of a wiping operation, for a third predetermined period when the wiper leaves the said parked position going towards the window, and for applying full power voltage to the motor at the end of the said predetermined third period.

11. Apparatus according to claim 10, wherein the said predetermined first and third periods are substantially equal to each other.

12. Apparatus according to claim 10, further including means for gradually increasing the voltage applied to the motor between the said first fraction of full power voltage and full power voltage itself, over a predetermined fourth period.

13. Apparatus according to claim 12, wherein the said predetermined fourth period is substantially equal to 70 milliseconds.

14. Apparatus according to claim 1, wherein the control system includes means for generating voltage pulses of variable duration and for applying said pulses to the motor, whereby the magnitude of the motor power supply voltage is varied by causing the duration of the voltage pulses applied to the motor to be varied.

15. Apparatus according to claim 1, including means for applying the power supply voltage to the motor alternately in one sense and in the opposite sense, whereby to cause the wiper to oscillate.

* * * * *